United States Patent
Cheema et al.

[15] 3,692,845
[45] Sept. 19, 1972

[54] PURIFICATION OF PHENOL

[72] Inventors: Zafarullah K. Cheema, Morristown; Pasquale J. Apice, Cresskill; Edwin D. Little, Convent Station, all of N.J.

[73] Assignee: Allied Chemical Corporation, New York, N.Y.

[22] Filed: March 12, 1969

[21] Appl. No.: 806,693

Related U.S. Application Data

[63] Continuation-in-part of Ser. No. 734,219, June 4, 1968, abandoned.

[52] U.S. Cl. ..........................260/621 A, 260/621 C
[51] Int. Cl. ........................C07c 37/24, C07c 37/08
[58] Field of Search ............260/567.5, 621 A, 621 C

[56] References Cited

UNITED STATES PATENTS

| | | |
|---|---|---|
| 1,942,838 | 1/1934 | Semon..................260/567.5 X |
| 2,490,670 | 12/1949 | Cislak et al. ............260/621 A |
| 3,285,973 | 11/1966 | Arai et al...............260/621 A |

OTHER PUBLICATIONS

Layer, " Chem Reviews" Vol. 63, pp. 489– 494 (1963)

Primary Examiner—Leon Zitver
Assistant Examiner—Norman Morgenstern
Attorney—Patrick L. Henry and Gerhard H. Fuchs

[57] ABSTRACT

This invention relates to the purification of phenol produced by the decomposition of cumene hydroperoxide by heating the phenol with a polyamine compound to remove carbonyl-bearing impurities and then acidifying the phenol to give a product which remains color stable on aging. After the addition of the polyamine compound, the phenol is distilled free of the polyamine compound and the carbonyl-bearing impurities. This distillation can be carried out either before or after the acid is added.

8 Claims, No Drawings

PURIFICATION OF PHENOL

CROSS-REFERENCE TO RELATED APPLICATION

This application is a continuation-in-part of our copending application Ser. No. 734,219, filed June 4, 1968, "Purification of Phenol", now abandoned.

PURIFICATION OF PHENOL

The production of phenol by the oxidation of cumene and the decomposition of the resulting hydroperoxide in the presence of an acidic catalyst is well known in the art. The decomposition product contains phenol and acetone as the principal products along with minor amounts of various side products. By fractional distillation, phenol can be obtained which is sufficiently pure for many uses. However, such phenol is unsatisfactory for certain purposes and, in particular, when chlorinated or sulfonated with sulfuric acid the phenol discolors and becomes red. Additionally, such phenol generally discolors on aging becoming yellow or pink.

The above-described discoloration on chlorination and sulfonation results from the presence of certain carbonyl-bearing impurities which are not separated by ordinary fractional distillation. These ketonic impurities are generally present in amounts exceeding 300 ppm and include primarily mesityl oxide, acetol and acetophenone.

In accordance with the present invention, it has been discovered that if phenol of the above type containing carbonyl-bearing impurities is contacted with polyamine, an interaction takes place with the ketonic impurities following which it is possible to distill the phenol free from both the polyamine compounds and the ketonic impurities. Phenol thus obtained is substantially free of ketonic impurities and exhibits markedly less discoloration when chlorinated or sulfonated. However, the polyamine treated phenol still discolors on standing and in fact color stability with aging appears to be lessened.

As another aspect of the present invention, it has been discovered that color stability with aging can be imparted if after treatment with a polyamine, the phenol is further treated with an acid. This treatment can be carried out either before or after the phenol is distilled free of the ketonic impurities.

A wide variety of polyamine compounds can be employed in the present invention and any polyamine can be used in which the amino groups are primary or secondary and in which no substituents are present which interfere with the reaction. Suitable polyamines include compounds of the formula $$R_1-\underset{\underset{H}{|}}{N}-(R-\underset{\underset{R_3}{|}}{N})_n-R-\underset{\underset{H}{|}}{N}-R_2$$

wherein $n$ is an integer from 0 to 4, preferably 0 or 1, and most preferably 0, $R_1$, $R_2$ and $R_3$ are independently selected from the group consisting of hydrogen; alkyl, preferably one to 10 carbon atoms; aryl, preferably of six to 10 carbon atoms; cycloalkyl, preferably of four to 10 carbon atoms; aralkyl, preferably of seven to 20 carbon atoms and alkaryl, preferably of seven to 20 carbon atoms, and R, which may be the same or different in different

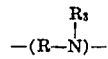

groups, is a member selected from the group consisting of alkyl-ene, preferably of one to 40 carbon atoms; arylene, preferably of six to 10 carbon atoms; alkylenarylene, preferably of seven to 20 carbon atoms; dialkylenearylene, preferably of seven to 20 carbon atoms; cycloalkylene, preferably of four to 10 carbon atoms; dialkylenecycloalkylene, preferably of six to 20 carbon atoms; nitrogen containing heterocyclic groups of five to six carbon atoms and the lower alkyl substituted, hydroxy substituted and carboxyl substituted derivatives of the above listed radicals. $R_1$, $R_2$ and $R_3$ are preferably all hydrogen, and R is preferably alkylene or arylene, including lower alkyl, hydroxy or carboxyl substituted derivatives thereof. The alkyl and alkylene groups in these polyamine compounds may be straight-chain, branched-chain or cyclic. These polyamines may be used in the form of a single compound, as a mixture of isomers, or as a mixture of polyamines containing from two to six amino nitrogen atoms in the molecule. Illustrative of suitable polyamines are: ortho, meta and para-xylylenediamine; ortho, meta and paratolylene diamine; hexamethylene diamine; ortho, meta and paraphenylenediamine; 4,5-diamino-xylene; 3,5-diaminobenzoic acid; 3,4-diaminobenzoic acid; 2,6-diaminopyridine; 1,5-diaminonaphthalene; 1,2-diaminonaphthline; 1,5-diaminopentane; 1,4-cyclohexanebis (methylamine); N-(3-aminopropyl)cyclohexylamine; N-phenylethylenediamine; 1,3-diamino-2-hydroxypropane; diethylene triamine; di-n-propylene triamine; di-i-butylene triamine; di-n-hexylene triamine, triethylene tetramine; tri-i-propylene tetramine; tri-n-hexylene tetramine; 4-(2-aminoethyl)-diethylene triamine; tetraethylene pentamine; tetra-n-propylene pentamine, tetra-n-butylene pentamine; pentaethylene hexamine; and amines of the formulas

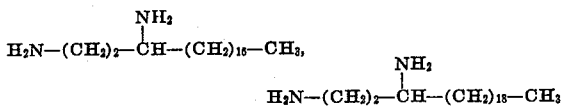

and $H_2N—R^1—NH_2$ where R is an aliphatic hydrocarbon chain of 36 carbon atoms.

The polyamine interacts with or binds the carbonyl-bearing impurities in such a manner that phenol free of the carbonyl-bearing impurities can be recovered by distillation. The amount of polyamine compound required is, to some extent, dependent upon the concentration of carbonyl-bearing impurities present in the phenol. In general, the amount of polyamine used is about 0.01–2.0 percent; preferably about 0.03–1.0 percent based on the weight of the phenol.

The exact temperature at which the phenol is treated with the polyamine compound is not critical. Generally, the treatment is carried out at a temperature of 40°–220°C. and preferably 60°–200°C. The time of the treatment should be long enough to permit the desired reaction to take place. In general, substantial reaction can be obtained in one minute with a minimum time of about five minutes being preferred.

As previously stated, the acid treatment which follows the addition of polyamine compound can be carried out either before or after the phenol is distilled free of the ketonic impurities. If the acid or acid anhydride is added before the distillation, about 0.5–10 mols of acid, preferably about two to six mols of acid should be

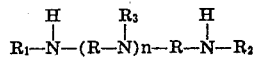

added for each mol of polyamine compound present. The acid should be permitted to react in the system for at least one minute, preferably at least five minutes before the distillation. Preferably, the reaction of the acid in the polyamine-treated phenol system is carried out at a temperature of about 40°–200° C. If the acid is added after the distillation, the amount of acid or acid anhydride employed should be about 0.005–0.4 percent, preferably 0.01–0.2 percent based on the weight of the phenol.

A wide variety of acids or acid anhydride can be used, the only requirement being that no substituents be present that produce unwanted side reactions. Suitable acids include mineral acids such as hydrochloric acid, sulfuric acid, nitric acid, phosphoric acid, etc., organic acids such as phthalic acid, fumaric acid, p-toluene-sulfonic acid, etc. and acid anhydrides such as $P_2O_2$, $SO_3$, phthalic anhydride; 1,4,5,6,7,7-hexachloro-cicyclo[2.2.1]-5-heptene-2,3-dicarboxylic anhydride, tetrachlorophthalic anhydride, etc.

The distillation whereby the phenol is freed from the ketonic impurities can be carried out at atmospheric pressure, reduced pressure or super-atmospheric pressure. preferably, distillation is carried out at atmospheric pressure or reduced pressure at a temperature of 80°–182° C. depending upon the pressure in the system.

The following examples are given to further illustrate the invention and to set forth the best modes contemplated by us of carrying out the invention, but it is to be understood that the invention is not to be limited by the details described therein. In the examples the following procedures were used for the sulfonation and chlorination color tests.

$H_2SO_4$ Color Test:

4.0 g. of the phenol (at about 50°–60° C.) to be tested is placed in a sulfonation vessel and 0.4 ± 0.01 g. of conc. $H_2SO_4$ is added. The mixture is heated in an oil bath with stirring to 150° C. and held at that temperature for five minutes. The sulfonated phenol is then allowed to cool (about one min.) and then transferred to a 1 cm. cell and analyzed by a recording spectrophotometer. The maximum absorption (O.D.) at about 496 m.u. is noted for test purposes. Distilled water is used as a reference.

$Cl_2$ Color Test:

12.0 g. of the phenol to be tested is placed in a chlorination vessel fitted with a gas inlet tube extending to the bottom of the vessel. The bottom of the inlet tube is constructed of fritted glass to allow fine dispersion of chlorine as it enters the liquid phenol. The vessel is placed in an oil bath and the sample brought to 80° C. Chlorine gas is introduced into the phenol at a controlled rate over five mins. whereby 1.2 g. chlorine is added. The sample is reweighed to confirm 10 percent chlorination and then transferred to a 1 cm. cell for analysis by a recording spectrophotometer. The absorption maximum (O.D.) at about 488 to 496 m.u. is noted for test purposes. Distilled water is used as a reference.

In these color tests, the higher the absorption value (O.D.) the more discolored the product. The phenol starting materials used in the examples were produced in accordance with well-known procedures by oxidizing cumene to the hydroperoxide, cleaving the hydroperoxide in the presence of an acidic catalyst and recovering phenol by fractional distillation.

EXAMPLE 1

The phenol starting material contained a total of 868 ppm of impurities of which 683 ppm were ketonic (mainly mesityl oxide, acetol and acetophenone). 240 grams of the phenol and 0.24 grams of m-xylenediamine (MXDA) were heated for about 15 minutes at 55°–60° C. and distilled at atmospheric pressure. An 81 percent heart cut was collected and part of it was treated with 0.15 percent by weight of Phosphoric Acid at 60° C. until a homogeneous solution was obtained. The pH was less than 2.0 at 55° C. Untreated phenol, phenol treated with MXDA only, and phenol treated with MXDA and phosphoric acid were analyzed and tested for color stability. The results are as follows:

|  | Untreated Phenol | MXDA treated | MXDA-$H_3PO_4$ treated |
| --- | --- | --- | --- |
| Impurities (ppm) | 868 | 321 | 234 |
| Ketonic impurities (ppm) | 683 | 46 | 32 |
| $H_2SO_4$ Test (O.D.) | 1.7 | 0.22 | 0.26 |
| $Cl_2$ Test (O.D.) | 1.3 | 0.35 | 0.31 |
| Color Stability at 60°C. | Yellow | Pink in 2 hrs. | white in >11 days |

EXAMPLE 2

A quantity of the same phenol starting material as used in Example 1 was treated with 0.1 percent meta-xylylene-diamine (MXDA) based on phenol weight for 15 minutes. Aliquots were then acidified with varied amounts of $H_3PO_4$. These aliquots plus a sample of the phenol treated with MXDA only were distilled at atmospheric pressure and the heart cuts (60–65 percent) were analyzed for quality and color stability. The results are as follows:

| Run | pH before dist. | $H_2SO_4$ test O.D. | $Cl_2$ test O.D. | pH after dist. | Impurities (p.p.m.) Total | Ketones* | Color-stability at 60° C. |
| --- | --- | --- | --- | --- | --- | --- | --- |
| 1. Untreated phenol | | 1.7 | 1.3 | | 868 | 683 | Turns yellow. |
| 2. MXDA treated | 6.0–6.6 | 0.4 | 0.4 | 5.4 | 186 | 98 | Pink in few hours. |
| 3. With $H_3PO_4$, 0.16% | 3.8 | 0.5 | 0.5 | 5.0 | 246 | 132 | Do. |
| 4. With $H_3PO_4$, 0.20% | 2.0 | 0.6 | 0.6 | 4.9 | 256 | 135 | Lt. pink. |
| 5. With $H_3PO_4$, 0.40% | 1.0 | 0.7 | 0.5 | 4.7 | 219 | 135 | White, 21 days. |

*Ketones analyses based on mesityl oxide, acetol and acetophenone content.

NOTE.—Runs 3, 4, and 5 had MXDA/$H_3PO_4$ mole-ratios of 1/2.2, 1/2.8 and 1/5.6, respectively.

EXAMPLE 3

The phenol starting material contained 953 ppm of impurities and had the following color characteristics:

Cl$_2$ test (O.D.) 1.3
H$_2$SO$_4$ test (O.D.) 1.7

300 grams of the phenol and 0.15 grams of meta-xylylene-diamine (MXDA) were mixed together and heated at 182° C. Concentrated H$_2$SO$_4$ was added to give a MXDA/H$_a$SO$_4$ mole ratio of 1:1. The charge was immediately distilled at 182° C. and a 67 percent heart cut collected. The product was analyzed for impurities and tested for color with the following results:

78 ppm of impurities
Cl$_2$ test (O.D.) 0.3
H$_2$SO$_4$ test (O.D.) 0.7 and color stable after nine days of storage at 60° C.

EXAMPLE 4

A sample of the phenol starting material used in Example 1 was treated with 0.1 percent MXDA (based on phenol weight) at 60° C. for about 15 minutes and then distilled at 180° C. The heart cut (64 percent) was separated into 4 equal parts and varying amounts of H$_3$PO$_4$ (1 percent solution in high purity phenol) were added to each to yield different levels of acidity. These were then analyzed for quality and color-stability. The results were as follows:

| Run No. | | pH | H$_2$SO$_4$ test O.D. | Cl$_2$ test O.D. | Impurities (p.p.m.) | Color On acidification | On standing |
|---|---|---|---|---|---|---|---|
| 1 | Untreated phenol | | 1.7 | 1.3 | 868 | | |
| 2 | MXDA treated, not acidified | 6.0 | 0.4 | 0.3 | 140 | | Pink. |
| 3 | MXDA treated plus 0.007% H$_3$PO$_4$ | 3.1 | 0.4 | 0.3 | 215 | Yellow-pink | Off-white. |
| 4 | MXDA treated plus 0.024% H$_3$PO$_4$ | 2.4 | 0.2 | 0.3 | 155 | Sl. yellow-pink | White. |
| 5 | MXDA treated plus 0.12% H$_3$PO$_4$ | 1.6 | 0.3 | 0.2 | 157 | V. lt. yellow | Do. |
| 6 | MXDA treated plus 0.20% H$_3$PO$_4$ | 0.7 | 0.5 | 0.2 | 165 | do | Do. |

EXAMPLE 5

The starting phenol employed contained 1043 ppm of impurities. 1.2 kilograms of this phenol and 1.2 grams of meta-xylylenediamine (MXDA) were heated together at 165°–170° C. for one hour. Aliquots were then treated with various acids and acid anhydrides at temperatures in the range of 120°–170° C. for times ranging from one-half to 24 hours. The purified phenol was then recovered (70–80 percent heart cuts) by distillation at 100–110 millimeters pressure. The results are given in the following Table with the concentration of each acid or anhydride in percent of the weight of the phenol being indicated in parenthesis after the name of each compound:

| Acid or Anhydride | MXDA Acid Mole-Ratio | H$_2$SO$_4$ Test O.D. | Cl$_2$ test O.D. | Impurities (ppm) | Color stability at 60°C. |
|---|---|---|---|---|---|
| p-Toluenesulphonic acid (0.32%) | 1/2.5 | – | 0.3 | 187 | white 26 days |
| p-Toluenesulphonic acid (0.31%) | 1/2 | 0.6 | 0.2 | 135 | white 3 days |
| 85% H$_3$PO$_4$ (0.43%) | 1/6 | 0.6 | 0.5 | 309 | white 4 days |
| 100% H$_3$PO$_4$ (0.43%) | 1/6 | – | 0.5 | 223 | white 17 days |
| P$_2$O$_5$ (0.50%) | 1/7 | – | 0.5 | 269 | white 6 days |
| "HET" Anhydride* (0.54%) | 1/2 | 0.3 | 0.6 | 260 | white 11 days |
| Tetrachlorophthalic (0.45%) Anhydride | 1 1/2 | 0.4 | 0.6 | 231 | white 10 days |
| Fumaric Acid (0.171 | 1/2 | 0.4 | 0.4 | 219 | white 4 days |
| Phthalic Anhydride (0.22%) | 1/2 | 0.3 | 0.5 | 197 | white 6 days |
| Phthalic Anhydride (0.22%) | 1/2 | 0.5 | 0.7 | 211 | white 3 days |
| 96% H$_2$SO$_4$ (0.33% c | 1/1 | 0.7 | 0.3 | 78 | white 9 days |
| Control, Untreated Phenol | – | 1.8 | 1.3 | 1043 | yellow 4 days |

*1.4.5.6.7.7-hexachlorobicyclo[2.2.1]-5-heptene-2,3-dicarboxylic anhydride.

EXAMPLE 6

500 grams of the same phenol as used in Example 5 were admixed with 0.5 grams of m-xylylenediamine (MXDA) and the mixture was heated at 140° C. for 1 hour. The mixture was divided into samples and different amounts of phthalic anhydride were added thereto. The samples were heated at 140° C. for 1 hour and then the phenol was distilled at 110°–120° C. under reduced pressure and heart cuts collected. The products were analyzed and the color stability tested.

The results are given in the following table: %)

| MXDA/ PAA Mole Ratio | H$_2$SO$_4$ Test O.D. | Cl$_2$ Test O.D. | Impurities (ppm) | Color Stability at 60°C. |
|---|---|---|---|---|
| 1/0.5 | 0.23 | 0.60 | 344 | V. lt. yellow |
| 1/1 | 0.30 | 0.57 | 209 | White |
| 1/2.5 | 0.31 | 0.50 | 229 | White |
| 1/3 | 0.53 | 0.77 | 290 | V. Sl. yellow |
| Untreated Phenol— | 1.8 | 1.3 | 1043 | yellow-lt. amber |

EXAMPLE 7

A sample of the same phenol as used as a starting material in Example 5 was admixed with 0.1 percent by weight of meta-xylylenediamine (MXDA). The mixture was divided into a number of portions which were heated for the times and at the temperatures indicated in the Table below. After treatment with MXDA, phthalic anhydride (PAA) was added (MXDA/PAA=½ mol ratio) and the indicated temperature held for an additional ½ hour. The phenol samples were distilled at 100°–115° C. under reduced pressure and heart cuts collected. The products were analyzed and their color stability determined. The results are indicated in the following table:

| Temp. (°C.) | Time (hrs.) | H$_2$SO$_4$ Test O.D. | Cl$_2$ Test O.D. | Impurities (ppm) | Color Stability at 60°C. |
|---|---|---|---|---|---|
| 80 | 1 | 0.83 | 0.74 | 209 | white 12 days |
| 80 | 5 | 0.49 | 0.53 | 257 | V Sl. yellow 12 |

| | | | | | |
|---|---|---|---|---|---|
| 80 | 8 | 0.31 | 0.62 | 189 | V Sl. yellow 12 days |
| 110 | 1 | 0.38 | 0.70 | 233 | white 3 days |
| 110 | 5 | 0.49 | 0.53 | 216 | white 3 days |
| 110 | 8 | 0.29 | 0.59 | 188 | white 3 days |
| 140 | 1 | 0.29 | 0.70 | 231 | white 11 days |
| 140 | 5 | 0.36 | 0.63 | 200 | white 11 days |
| 140 | 8 | 0.14 | 0.68 | 261 | white 11 days |

EXAMPLE 8

Phenol at 165° C. was treated with 0.1 percent based on the phenol weight of meta-xylylenediamine (MXDA) with stirring. Aliquots were removed at various time intervals and chilled to stop any further reactions. The samples were analyzed by chromatographic analysis and the results are shown below:

| | Reaction Time, (Mins.) at 165°C. | | | | |
|---|---|---|---|---|---|
| | 0 | 1 | 30 | 120 | 480 |
| Mesityl Oxide | 91 | 82 | 81 | 58 | 37 |
| Acetol | 718 | 43 | 0 | 0 | 0 |
| Acetophenone | 148 | N.C. | 123 | 85 | 88 |
| Total Impurities* | 1133 | 448 | 356 | 288 | 233 |

*Several other impurities are present in low ppm.

This experiment shows that short reaction times can be used to reduce major carbonyl impurity-acetol.

EXAMPLE 9

To show the effect of m-xylylenediamine (MXDA) concentration, samples of three phenols were treated with various amounts of MXDA. The first phenol contained 530 ppm of total impurities including 348 ppm ketonic impurities. The second phenol contained 1,036 ppm total impurities including 903 ppm of ketonic impurities. The third phenol contained 1695 ppm of total impurities including 1255 ppm of ketonic impurities. The results are shown in the following tables:

TABLE A

| Run No. | MXDA (%) | Temp. (°C.) | Time (hrs.) | $H_2SO_4$ Test O.D. | $Cl_2$ Test O.D. | Impurities Total (ppm) | Ketonic (ppm) |
|---|---|---|---|---|---|---|---|
| 1 | 0.00 | (untreated) | – | 2.4 | 1.4 | 530 | 348 |
| 2 | 0.02 | 182 | 0.25 | 0.5 | 0.7 | 275 | 158 |
| 3 | 0.03 | 182 | 0.25 | 0.3 | 0.7 | 154 | 86 |
| 4 | 0.08 | 182 | 0.25 | 0.2 | 0.4 | 98 | 18 |
| 5 | 0.12 | 182 | 0.25 | 0.2 | 0.3 | 99 | 3 |

TABLE B

| Run No. | MXDA (%) | Temp. (°C.) | Time (hrs.) | $H_2SO_4$ Test O.D. | $Cl_2$ Test O.D. | Impurities Total (ppm) | Ketonic (ppm) |
|---|---|---|---|---|---|---|---|
| 1 | 0.00 | (untreated) | – | 1.6 | 1.5 | 1036 | 903 |
| 2 | 0.04 | 100 | 2.5 | 0.3 | 0.7 | 256 | 149 |
| 3 | 0.07 | 100 | 2.5 | 0.3 | 0.8 | 212 | 108 |
| 4 | 0.10 | 100 | 2.5 | 0.2 | 0.4 | 161 | 26 |

TABLE C

| Run No. | MXDA (%) | Temp. (C°.) | Time (hrs.) | $H_2SO_4$ Test O.D. | $Cl_2$ Test O.D. | Impurities Total (ppm) | Ketonic (ppm) |
|---|---|---|---|---|---|---|---|
| 1 | 0.0 | (untreated) | – | 1.2 | 1.4 | 1695 | 1255 |
| 2 | 0.08 | 100 | 1 | 0.2 | 0.5 | 422 | 274 |
| 3 | 0.13 | 100 | 1 | 0.1 | 0.4 | 255 | 131 |

EXAMPLE 10

This example shows the effect of a mixed toluenediamine (MTD) in removing the ketonic impurities of phenol. The starting phenol contained 1133 ppm of impurities of which 963 ppm were ketonic impurities. Aliquots of the phenol were treated with 0.1 percent by weight (based on the phenol weight) of a mixture containing 78 percent of 2,4-diamino-toluene, 19 percent of 2,6-diaminotoluene and 3 percent of 2,3- and 2,5-diaminotoluene and the samples were reacted for one hour at 165° C. Phthalic anhydride was then added in amounts to give MTD/PAA mole ratios of 1/0.5, 1/1 and 1/3. Heating was maintained at 165°C. for ¼ hour and 80 percent heart cuts were collected under reduced pressure and 165° C. Analysis of the products gave the following results:

| Run No. | MTD/PAA Mole-ratio | $H_2SO_4$ Test O.D. | $Cl_2$ Test O.D. | Impurities (ppm) | Color stability at 60°C. |
|---|---|---|---|---|---|
| 1 | 1/0.5 | 0.4 | 0.6 | 176 | wht. 7 days |
| 2 | 1/1 | 0.4 | 0.6 | – | wht. 10 days |
| 3 | 1/3 | 0.8 | 0.5 | – | wht. 7 days |

The above process was repeated using a sample having a MTD/PAA mole ratio of 1:3 except that after adding the phthalic anhydride the reaction mixture was heated at 165° C. for 20 hours. The product obtained contained 99 ppm of total impurities, less than 5 ppm ketonic impurities and was still white after 8 days' storage.

EXAMPLE 11

This example demonstrates the effectiveness of a number of polyamines in removing color-forming impurities. The phenol used was the same as that employed in Example 10. The polyamines were tested by adding 0.1 gram of each to 100 grams aliquots of the phenol and then heating the mixture to 182° C. for one hour. After distillation at atmospheric pressure, a 75 percent heart cut was obtained and analyzed. The results are as follows:

| Phenol Treated With | $H_2SO_4$ Test (O.D.) | $Cl_2$ Test (O.D.) | Impurities (ppm) |
|---|---|---|---|
| No Treatment | 1.8 | 1.5 | 1133 |
| 2,4-Toluenediamine | 0.3 | 0.6 | 230 |
| 3,4-Toluenediamine | 0.6 | 0.7 | 457 |
| 2,5-Toluenediamine | 0.4 | 0.6 | 334 |
| 2,6-Toluenediamine | 0.3 | 0.8 | – |
| o-phenylenediamine | 0.4 | 0.5 | |
| m-phenylenediamine | 0.2 | 0.9 | 249 |
| 4,5-Diamino-O-xylene | 0.4 | 0.8 | |
| 3,5-Diaminobenzoic Acid | 0.6 | 0.6 | |
| 3,4-Diaminobenzoic Acid | 0.5 | 0.7 | |
| 2,6-Diaminopyridine | 0.8 | 0.7 | |
| 1,5-Diaminonaphthalene | 0.2 | 0.7 | |
| p-phenylenediamine | – | 0.9 | 337 |
| 1,2-Diaminonaphthalene | 0.8 | 0.8 | |

EXAMPLE 12

Aliquots of phenol were treated with hexamethylenediamine (HMDA) at the concentrations indicated below at 180° C. (based on the phenol weight) for 1 hour and then distilled at 182° C. A 90 percent heart cut was taken as the product and analyzed. The results are indicated in the following table:

| % HMDA | $H_2SO_4$ Test (O.D.) | $Cl_2$ Test (O.D.) | Impurities (ppm) | Remarks |
| --- | --- | --- | --- | --- |
| 0.00 | 1.8 | 1.5 | 1133 | 963 ppm total ketones* |
| 0.01 | 1.5 | 0.9 | 635 | 478 ppm total ketones* |
| 0.02 | 1.1 | 0.7 | 320 | 218 ppm total ketones* |
| 0.03 | 0.7 | 0.7 | 185 | 79 ppm total ketones* |
| 0.04 | 0.4 | 0.5 | 174 | 35 ppm total ketones* |
| 0.07 | 0.2 | 0.5 | 95 | 0 ppm total ketones* |

*consists mainly of mesityl oxide, acetol, acetophenone.

All of the above distillates developed a light pink color upon aging a few hours at 60° C.

EXAMPLE 13

The following example shows the effect of different concentrations of phthalic anhydride (PAA) on color stability after impure phenol has been treated with hexamethylenediamine (HMDA). Aliquots of the same phenol as used as starting material in Example 10 were treated at 165° C. for 1 hour with 0.1 percent HMDA, based on the phenol weight, and then the amounts of PAA shown below were added. The mixtures were then heated at 165° C. for 5 hours and distilled. The distillates were analyzed and tested for color stability with the following results:

| HMDA/PAA mole-ratio | $H_2SO_4$ Test (O.D.) | $Cl_4$ Test (O.D.) | Impurities (ppm) | Color Stability at 60°C. |
| --- | --- | --- | --- | --- |
| 1/0.5 | 0.2 | 0.3 | 87 | Pink in few hrs. |
| 1/1 | 0.3 | 0.4 | 124 | Pink after 10 days |
| 1/2 | 0.6 | 0.4 | 261 | White |
| 1/3 | 0.4 | 0.6 | 203 | White>2 weeks |

EXAMPLE 14

This example illustrates treating phenol with a diamine at a temperature above the atmospheric boiling point of phenol. A sample of phenol starting material as described in Example 10 was treated with 0.1 percent of HMDA, based on the phenol weight, at 220° C. (about 2 atmospheres pressure) for 6 hours and then distilled at atmospheric pressure. A 90 percent heart cut was collected and analyzed with the following results:

$H_2SO_4$ Test (O.D.) 0.07
$Cl_2$ Test (O.D.) 0.05
and total impurities 136 ppm.

EXAMPLE 15

This example illustrates the use of a combination of polyamines. A phenol starting material as described in Example 1 was admixed with 0.1 percent based on the phenol weight of a mixed diamine containing 60 percent by weight of the mixed toluene diamine described in Example 10 and 40 percent of hexamethylenediamine. The reaction mixture was heated at 160° C. for 25 minutes. Phthalic anhydride (0.24 percent on phenol weight) was added and the temperature brought to 182° C. and distilled immediately. After distillation, the center cut was analyzed and tested for color stability with the following results:

$H_2SO_4$ Test (O.D.) 0.7
$Cl_2$ Test (O.D.) 0.6
Impurities (ppm) 370
Color Stability (at 60° C.) white after 51 days The untreated phenol had 870 ppm total impurities and sulfonation and chlorination values of 1.7 and 1.3, respectively.

EXAMPLE 16

The following example illustrates the use of a product containing mixed aliphatic diamines (MAD). The amines consisted of 90% of the compound $H_2N-(CH_2)_2-$

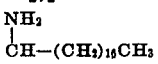

and 10% of the compound

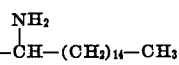

Aliquots of phenol were treated with 0.04 and 0.25 weight percent of the above mixed product for two hours at 182° C. and then distilled. Analyses of the distillates (71 percent center cut) are shown below:

| Run No. | | $H_2SO_4$ Test (O.D.) | $Cl_2$ Test (O.D.) | Impurities (ppm) |
| --- | --- | --- | --- | --- |
| 1 | Untreated Phenol | 1.6 | 1.5 | 1036 |
| 2 | 0.25% MAD | 0.7 | 0.4 | 131 |
| 3 | 0.04% MAD | 1.4 | 0.9 | 553 |

EXAMPLE 17

This example illustrates the reduction of color-forming impurities in phenol by the use of a diamine dimer having the formula $H_2N-R'-NH_2$ where $R'$ is an aliphatic hydrocarbon chain at 36 carbon atoms. The phenol was treated with the diamine dimer at concentrations of 0.05 and 0.10 percent based on the phenol weight for 1 hour at 182° C. and then distilled. A 78 percent center cut was collected and analyzed. The results are shown below:

| Run No. | | $H_2SO_4$ Test (O.D.) | $Cl_2$ Test (O.D.) | Impurities (ppm) |
| --- | --- | --- | --- | --- |
| 1 | Untreated Phenol | 1.8 | 1.5 | 1133 |
| 2 | 0.05 % diamine dimer | 1.0 | 0.6 | — |
| 3 | 0.1% diamine dimer | 0.4 | 0.6 | — |

EXAMPLE 18

The procedure of Example 17 was repeated employing as polyamine a 0.1 percent by weight concentration of 1,5-diamino-pentane. The results are given in the following table:

| Run No. | | $H_2SO_4$ Test (O.D.) | $Cl_2$ Test (O.D.) | Impurities (ppm) |
| --- | --- | --- | --- | --- |
| 1 | Untreated Phenol | 1.8 | 1.5 | 1133 |

| 2 | 0.1% 1,5-Diamino-pentane | 0.3 | 0.3 | — |

EXAMPLE 19

A starting phenol containing 1.133 ppm of impurities, of which 967 ppm were ketonic impurities consisting mainly of mesityl oxide (91 ppm), acetol (718 ppm, and acetophenone (148 ppm) and having the following sulfonation and chlorination characteristics:
  $H_2SO_4$ Test (O.D.) 1.8
  $Cl_2$ Test (O.D.) 1.5
was treated with 0.1 percent based on the phenol weight of a mixed polyamine consisting of di-hexamethylene triamine (about 47 percent) and higher homologues thereof of the formula $$NH_2[(CH_2)_6NH]_nH$$

wherein n is greater than 2 (about 48 percent) for one hour at atmospheric pressure reflux temperature. Following the polyamine treatment 0.3 percent by weight of phthalic anhydride was added and the mixture was maintained at 140°–150° C. for ½ hour. After distillation, collecting an 85 percent heart cut after discarding a 5 percent forecut, the phenol so purified had the following sulfonation, chlorination and impurity values:
  $H_2SO_4$ Test (O.D.)  0.44
  $Cl_2$ Test (O.D.)  0.70
  Total impurities (ppm)  382
  Ketonic impurities (ppm)  167
The phenol so treated remained colorless after seven days storage at 60° C.

EXAMPLE 20

The following example illustrates the effect of additional polyamines in reducing the color-forming impurities of phenol. The starting phenol contained 1133 ppm of impurities and had the following sulfonation and chlorination test characteristics:
  $H_2SO_4$ Test (O.D.) 1.8
  $Cl_2$ Test (O.D.) 1.5
This phenol was mixed with 0.1 percent based on the phenol weight of the polyamines listed below and heated for one hour at 182° C. After distillation, the product was analyzed. The sulfonation, chlorination and impurity (ppm) values are shown in parentheses.

| | Chlorination | Sulfonation | Impurities |
|---|---|---|---|
| 1,4-cyclohexanebis (methylamine) $H_2NCH_2$⟨S⟩—$CH_2NH_2$ | 0.4 | 0.6 | ---------- |
| N-(3-aminopropyl) cyclohexylamine ⟨S⟩—$\overset{H}{N}(CH_2)_3$—$NH_2$ | 0.3 | 0.4 | 182 |
| N-phenylethylenediamine ⟨⟩—$\overset{H}{N}$—$(CH_2)_2$—$NH_2$ | 0.2 | 0.4 | ---------- |
| 1,3-diamino-2-hydroxypropane $H_2NCH_2\overset{OH}{\underset{|}{C}}HCH_2NH_2$ | 0.2 | 0.3 | ---------- |

To demonstrate that distillation does not remove impurities, a sample of phenol prepared by the decomposition of cumene hydroperoxide was subjected to simple distillation and an 80 percent center cut was collected. Before distillation, the phenol had the following sulfonation and chlorination test values:
  $H_2SO_4$ Test (O.D.) 1.7
  $Cl_2$ Test (O.D.) 2.0
After distillation,
  $H_2SO_4$ Test (O.D.) 1.2
  $Cl_2$ Test (O.D.) 1.5
Another phenol sample having a total impurity content of 1089 ppm,
  $H_2SO_4$ Test (O.D.) 1.8
  $Cl_2$ Test (O.D.) 1.2
was subjected to steam distillation with up to 16 percent water present. An 85 percent center cut was collected and analyzed as follows:
  944 ppm of impurities
  $H_2SO_4$ Test (O.D.) 1.2
  $Cl_2$ Test (O.D.) 1.0
To demonstrate that acids and acid anhydride treatment does not remove impurities, phenol was treated with $H_3PO_4$ in an amount equal to 0.3 percent of the phenol weight and phthalic anhydride in an amount equal to 0.22 percent of the phenol weight and distilled at atmospheric pressure. The 70 percent center cuts were analyzed as follows:

| | $H_2SO_4$ Test (O.D.) | $Cl_2$ Test (O.D.) | Impurities (ppm) |
|---|---|---|---|
| ($H_3PO_4$ treated | 1.5 | 1.1 | 645 |
| (Untreated | 1.7 | 1.3 | 868 |
| (PAA treated | 1.8 | 1.0 | 1104 |
| (Untreated | 1.8 | 1.5 | 1133 |

It will be apparent that many modifications and variations can be effected without departing from the scope of the novel concepts of the present invention and the illustrative details disclosed are not to be construed as imposing undue limitations on the invention.

We claim:

1. A process for the purification of phenol produced by the decomposition of cumene hydroperoxide and containing carbonyl-bearing impurities which comprises contacting the phenol at a temperature of about 40° to 220° C. for at least one minute with 0.01 to 2.0 percent by weight of a polyamine compound of the formula

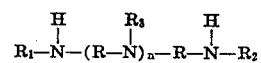

wherein n is an integer of from 0 to 4, $R_1$, $R_2$ and $R_3$ are independently selected from the group consisting of hydrogen, alkyl, aryl, cycloalkyl, aralkyl and alkaryl, and R, which may be the same or different in different

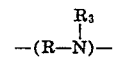

groups, is a member selected from the group consisting of alkylene, arylene, alkylene-arylene, dialkylenearylene, cycloalkylene, dialkylene cycloalkylene, and unsubstituted nitrogen-containing heterocyclic groups of five to six carbon atoms, adding 0.5 to 10 mols of an acid or acid anhydride per mol of polyamine compound and distilling said phenol free of said polyamine compound and said carbonyl bearing impurities.

2. A process as claimed in claim 1 wherein said phenol is contacted with said polyamine at a temperature of about 60° C. to 200° C. for at least five minutes prior to the addition of said acid.

3. A process as claimed in claim 2 wherein the amount of polyamine compound used is equal to 0.03 to 1.0 percent of the weight of the phenol.

4. A process as claimed in claim 2 wherein about 2 to 6 mols of acid or acid anhydride is added per mol of polyamine compound.

5. A process as claimed in claim 4 wherein after the addition of said acid the reaction mixture is heated at a temperature of 40° to 200° C. for at least one minute prior to said distillation step.

6. A process as claimed in claim 1 wherein in the polyamine compound of the formula

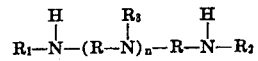

$R_1$, $R_2$ and $R_3$ are all hydrogen, and R is selected from the group consisting of straight chain alkylene, branched chain alkylene, and arylene.

7. A process as claimed in claim 5 wherein the polyamine compound is hexamethylene diamine and the acid or acid anhydride is phthalic acid or phthalic acid anhydride.

8. A process as claimed in claim 5 wherein the polyamine compound consists of di-hexamethylene triamine and higher homologues thereof of the formula $$NH_2[(CH_2)_6NH]_nH$$

wherein $n$ is greater than 2, and the acid anhydride is phthalic acid anhydride.

* * * * *